United States Patent [19]
Batchelor, Jr.

[11] 3,852,101
[45] Dec. 3, 1974

[54] STABILIZATION OF POLYESTER FIBERS WITH CARBODIIMIDE

[75] Inventor: David H. Batchelor, Jr., Cary, N.C.

[73] Assignee: Monsanto Company, St. Louis, Mo.

[22] Filed: Nov. 1, 1972

[21] Appl. No.: 302,710

[52] U.S. Cl. ............ 117/138.8 F, 8/115.6, 57/153, 260/45.9 R
[51] Int. Cl. ..................... C08g 51/60, D06m 13/38
[58] Field of Search ......... 117/138.8 F; 260/45.9 R, 260/551 CD; 8/115.6; 57/153

[56] References Cited
UNITED STATES PATENTS

| | | | |
|---|---|---|---|
| 2,853,473 | 9/1958 | Campbell et al. | 260/45.9 |
| 3,193,522 | 7/1965 | Neumann et al. | 260/45.9 |
| 3,193,524 | 7/1965 | Holtschmidt et al. | 260/45.9 |
| 3,296,190 | 1/1967 | Reischl et al. | 260/45.9 |
| 3,450,669 | 6/1969 | Nolen | 260/45.9 |
| 3,660,151 | 5/1972 | Weimar | 117/138.8 |

Primary Examiner—Herbert B. Guynn
Attorney, Agent, or Firm—Thomas Y. Awalt, Jr.

[57] ABSTRACT

The carboxyl end group concentration of polyethylene terephthalate fibers is lowered with a corresponding increase in hydrolytic stability by the surface application of a carbodiimide having the general formula:

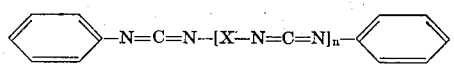

where $x$ is a radical selected from the group consisting of 2,4 tolylene, 2,6 tolylene and mixtures of the above; and $n$ has an average value of about 1.

8 Claims, No Drawings

STABILIZATION OF POLYESTER FIBERS WITH CARBODIIMIDE

Synthetic linear polyester filaments, yarns and cords are known to show improved strength under hydrolytic conditions or elevated temperatures when, either by the use of certain additives to the polymer, or chemical coatings on the polyester fiber, the carboxyl end group concentration is lowered.

One of the commonly employed methods of lowering the carboxyl level is by applying to the polyester fiber a surface coating which consists essentially of a carbodiimide or polycarbodiimide. United States patents relating to the use of such carbodiimides or polycarbodiimides include U.S. Pat. Nos. 3,193,522, 3,193,523 and 3,193,524.

It is an object of this invention to provide polyester fibers having a low carboxyl end group concentration with further improved hydrolytic and aminolytic stability.

It is yet another object of this invention to provide a process for the treatment of polyester fibers so that much improved hydrolytic and aminolytic stability may be obtained.

Briefly, the objects of this invention are attained by applying a liquid carbodiimide or a solution of the liquid carbodiimide reaction product of tolylene diisocyanate and phenyl isocyanate to the surface of the fiber by any convenient manner such as coating, spraying or dipping. The reaction product sought from the tolylene diisocyanate and phenyl isocyanate is a compound having the general formula:

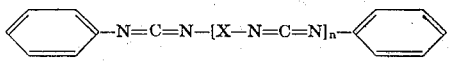

where $x$ is a radical selected from the group consisting of 2,4 tolylene, 2,6 tolylene and mixtures of the above; and $n$ has an average value of about 1.

I have discovered that superior hydrolytic and aminolytic stability in rubber tire reinforcements are obtained in the use of this particular carbodiimide as a stabilizing coating.

As used herein the term "rubber" is intended to be used in its usual and accepted generic sense to include rubber substitutes, natural rubber, compounded rubber, synthetic rubber, and the like. The term "carboxyl level" is used to include both the un-ionized acid group, — COOH and the ionized group, — COO —. Determination of the concentration of carboxyl groups is made in accordance with the procedure described by Pohl in Analytical Chemistry, Volume 26, page 1614, October, 1954, and is expressed in milliequivalents per gram. The term "relative viscosity" refers to the ratio of the viscosity of a 10 percent solution of polyethylene terephthalate in a mixture of 10 parts of phenol and 7 parts of 2,4,6 trichlorophenol (by weight) to the viscosity of the phenol-trichlorophenol mixture, measured in the same units at 25° C. Specific viscosity (Nsp), as reflected in the data contained herein, was obtained according to procedures well known in the art, employing 0.5 percent of the polymer in a 2:1 solution of phenol/-trichlorophenol.

The term "intrinsic viscosity" refers to the limit of the fraction $r/c$ as $c$ approaches 0, where $r$ is the relative viscosity as measured above, except that it is measured at several different concentrations in order to extrapolate to zero concentration.

"Polyester fibers" are those fibers composed of at least 85 percent by weight of an ester of a dihydric alcohol and terephthalic acid. The fibers include copolyesters of modifications of these polyesters and copolyesters.

Those polyesters and co-polyesters specifically useful in the instant invention are those resulting from heating one or more of the glycols of the series $HO(CH_2)_nOH$, in which $n$ is an integer from 2 to 10, with one or more dicarboxylic acids. Among the dicarboxylic acids useful in the present invention are terephthalic acid, isophthalic acid, sebacic acid, adipic acid, p-carboxyphenylacetic acid, succinic acid, p,p'-dicarboxyphenylthiocarbanilide, p,p'-dicarboxydiphenylsulfone, p-carboxyphenoxyacetic acid, p-carboxyphenoxypropionic acid, p-carboxyphenoxybutyric acid, p-carboxyphenoxyvaleric acid, p-carboxyphenoxyhexanoic acid, p-carboxyphenoxyheptanoic acid, p,p-dicarboxydiphenylmethane, p,p'-dicarboxydiphenylethane, p,p'-dicarboxydiphenylpropane, p,p'-dicarboxydiphenylbutane, p,p'-dicarboxydiphenylpentane, p,p'-dicarboxydiphenylhexane, p,p'-dicarboxydiphenylheptane, p,p'-dicarboxydiphenyloctane, p,p'-dicarboxydiphenoxyethane, p,p'-dicarboxydiphenoxypropane, p,p'-dicarboxydiphenoxybutane, p,p'-dicarboxydiphenoxypentane, p,p'-dicarboxydiphenoxyhexane, 3-alkyl-4-(beta-carboxyethoxy) benzoic acid, oxalic acid, glutaric acid, pimelic acid, suberic acid, azelaic acid and the dioxy acids of ethylene dioxide having the general formula

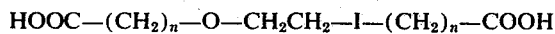

wherein $n$ is an integer from 1 to 4, and the like. Examples of the glycols which may be employed in practicing the instant invention are ethylene glycol, trimethylene glycol, tetramethylene glycol, decamethylene glycol, cyclohexane dimethanol and the like. Polyethylene terephthalate, however, is preferred because of the ready availability of terephthalic acid and ethylene glycol, from which it is made.

In order to obtain superior resistance to fatigue and thermal degradation, it is essential that the carboxyl concentration not be excessive. It has long been known that an excessively high concentration of free carboxyl groups results in fibers which exhibit an excessive loss of strength when used as reinforcements of rubber and when exposed to temperatures in excess of about 110° C. over prolonged period of time.

It is also essential that the fibers of this invention be prepared from polyethylene terephthalate polymers having a low concentration of aliphatic ether groups. As is well known in the art, the concentrations of ether groups should be no more than about 3 mole percent. At a higher level, the melting point of the polymer will be lower, and the rate of thermal degradation will be higher. Preferably, the concentration of ether groups should be less than about 2.5 mole percent. This may be achieved by purity of raw materials and/or by the use of inhibiters to the formation of diethylene glycol, as is well known in the art.

Also, as is well known in the art, it is essential that filaments of polyethylene terephthalate used in tire yarns and the like be spun from a polymer having a relative viscosity of at least about 60. It is preferable that filaments designed for use under severe conditions have a relative viscosity of at least about 80.

High viscosity or high molecular weight linear polyesters can be produced on a commercial scale by an ester interchange process. For example, in the production of highly polymeric linear polyethylene terephthalate, the dimethyl ester of terephthalic acid is heated with an excess of ethylene glycol in the presence of an ester interchange catalyst to produce, the bisglycol ester of terephthalic acid, with methyl alcohol and excess ethylene glycol being distilled off. The product is then polymerized by condensation reaction with the elimination of ethylene glycol by heating the product with a catalyst at elevated temperatures and under reduced pressures until a high molecular weight product is formed.

High molecular weight linear polyesters have also been produced by the direct esterification process. For example, in the production of highly polymeric linear polyethylene terephthalate, terephthalic acid may be heated with ethylene glycol to form the diglycol ester and low polymer thereof which can then be polymerized by heating in the presence of a catalyst under reduced pressures to form a high molecular weight product.

In order to provide a desired tenacity of at least about 6 grams per denier, filaments are drawn about 3–5 times their original length as is well known in the art. The drawing steps may be accomplished before or after treatments used to reduce free carboxyl groups when the polymer has an excessive concentration thereof.

To effect adhesion between the linear terephthalate polyester cords and a rubber, it is necessary to apply an adhesive coating to the cords. Any adhesive mixture may be used if it gives the desired level of adhesion between cord and rubber. For example, the cords may be coated with an organic solvent solution of a rubber and polyisocyanate is described in U.S. Pat. No. 2,415,839. Alternatively, the cords may be coated with an aqueous dispersion of a blocked isocyanate and a latex as described by Thompson et al, Adhesive Age, Vol. II, page 30, February 1959.

In order to obtain top level performance from reinforced rubber articles, it is a general practice to first combine yarn ends into a cord of the desired size and twist, and then apply heat to the cord under tension in order to stabilize the cord properties and thereby reduce both shrinkage and growth, as well as obtaining higher strength. Advantageously the adhesive mixture may be applied to the cord immediately prior to the hot tensioning operation so that the adhesive is cured onto the cord during the heating step. Alternatively, the adhesive may be applied and dried onto the cord in a separate operation.

The carbodiimide stabilizer of this invention is prepared by condensation of about 1.0 mole of tolylene diisocyanate and from about 2.0–2.4 moles of phenyl isocyanate with about 0.005 moles of 3-methyl-1-ethyl-3-phosphalene oxide as a catalyst. The reaction products may be represented by the general structure.

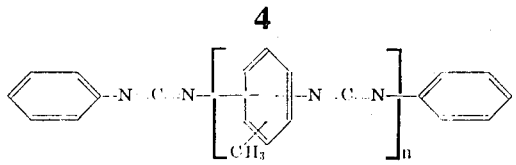

where the mixture is
$n = 0$, 30 percent by weight
$n = 1$, 35 percent by weight
$n = >1$, 35 percent by weight The structure where $n = 1$ is the desired product and is the most effective component of the mixture. The tolylenediisocyanate portion may be of the 2,4 configuration or a mixture of 2,4 and 2,6 isomers.

EXAMPLES

To the fiber surface of polyethylene terephthalate fibers prepared generally as described above, was applied a 2 percent (based on the weight of the fiber) coating of the carbodiimide of this invention. Fibers were then heated at 185° C. for 3 minutes. The treatment lowered the carboxyl end group concentration from 32 to 2 $\mu$eq/gram carboxyls. Treated samples were compared with untreated samples by measurement of breaking strength retained after hydrolysis and aminolysis. Samples were subjected to hydrolysis according to the Goodyear Sealed Tube Test hereafter described.

Samples were subjected to aminolysis by Goodyear Test, F.D. No. 9-7 entitled "Aminolytic Degradation of Polyester" hereafter described.

Results were as follows:

TABLE I

|  | Breaking Strength Retained After | |
|---|---|---|
|  | Hydrolysis | Aminolysis |
| Treated | 91% | 88% |
| Control | 74% | 52% |

In order to obtain comparative data of the effect of other commercially available carbodiimides on conventional polyester tire yarn, samples of the tire yarn were prepared from bundles of 1,000 denier/200 filament polyethylene terephthalate fibers surface treated with the carbodiimides indicated with subsequent heating for 3 minutes at 185° C. A comparison between the performance of other commercially available carbodiimides as shown in Table II demonstrates the superiority of the carbodiimide of this invention in terms of hydrolytic stability as measured by the standard tests described below.

Table II shows the additive treatment along with a 3 minute heating step all of which was accomplished before elastic dipping. Curing of the carbodiimide may, however, be effectively postponed until after elastic dipping.

TABLE II

Comparison of Various Carbodiimides As Surface Additives

| Surface Additive | Additive on Yarn | (2)COOH eq/gm | GSTT C.S. | Y+RSTT C.S. | GSTT C.S. |
|---|---|---|---|---|---|
| Diphenyl Carbodiimide | (1)~1% | 22.6 | 11.4 | 6.7 | — |
| Dicyclohexyl Carbodiimide | ~1 | 29.6 | 14.3 | 9.2 | — |
| Tolylenediisocyanate Carbodiimide (poly) | ~1 | 13.0 | 9.3 | 6.3 | — |

TABLE II – Continued

Comparison of Various Carbodiimides
As Surface Additives

| Surface Additive | Additive on Yarn | (2)COOH eq/gm | GSTT C.S. | Y+RSTT C.S. | GSTT C.S. |
|---|---|---|---|---|---|
| Phenyl Isocyanate/Tolylene-diisocyanate-2,4 carbodiimide | ~1 | 9.8 | 5.7 | 5.5 | — |
| Control (first series) | — | 31.3 | 16.4 | 12.3 | 41.2 |
| Commercially available carbodiimide | (3)2 | 30.3 | 14.1 | 14.6 | 28.5 |
| Commercially available poly-carbodiimide | (3)2 | 31.7 | 22.9 | 10.0 | 34.5 |
| Phenyl Isocyanate/tolylene-diisocyanate-2,4 carbodiimide | (3)2 | 3.7 | 13.2 | 12.4 | 19.3 |
| Control (second series) | — | 32.4 | 29.4 | 10.5 | 41.2 |

(1)Applied by dipping 1300/3 cord into 2% solutions and heating 185° C./3 min.
(2)Cords heated 3 min. at 185° C.
(3)Solutions metered on, dried at 100° C.

Abbreviations
GSTT = Goodyear Sealed Tube Test
Y+RSTT = Yarn plus Rubber Sealed Tube Test
Y in RSTT = Yarn in Rubber Sealed Tube Test
C.S. = No. of Chain Scissions Goodyear Sealed Tube Test (GSTT) — Modified A sealed tube test similar to Goodyear Test FD No. 9-3 was used to measure the hydrolytic stability of both greige and treated cords. A 1.5 gram sample of cord was placed in a 50 ml pyrex pressure tube with a crown cap top. After conditioning the sample, tube, cap and neoprene rubber sealer for 24 hours at 70° F. and 65 percent R.H., the tube was sealed while in this environment. The sealed tube was then placed in an oven at 149° C. for 48 hours. After about 36 hours the sealed tube was opened and the breaking strength of the cord measured. Ten breaks were made on the cord in each tube and two tubes were run on each cord sample. Ten breaks were made on a sample of the cord not exposed to the sealed tube test to obtain the initial breaking strength. The following relationship was used to calculate per cent breaking strength retention:

Percent BSR = Av. Final Breaking Strength/Av. Initial Breaking Strength × 100

In addition to strength retention, the number of chain scissions occurring during the sealed tube test was calculated from the initial and final solution viscosities of the cords using the following equation:

No. Scissions in $\mu$-moles/g = $(1/\overline{M}nF - 1/\overline{M}nI) \times 10^6$ where $\overline{M}nF$ and $\overline{M}nI$ are the final and initial number average molecular weights. The relationship between number average and weight average molecular weight was assumed to be $$\overline{M}w = 1.9 \overline{M}n$$

Yarn in Rubber Sealed Tube Test (Y in RSTT)

An aluminum strip 1/16 inch × ¼ inch × 5 inches was prepared with a notch in each end. A sample of tire yarn or cord of 0.5 gm was wound lengthwise about this strip. The composite is sandwiched between two layers of rubber and cured such that the cord and aluminum strip are completely embedded in the rubber strip. The rubber was cured for 30 minutes, starting with the mold at 25° C., under 5 tons of pressure at 160° C. The cured strip measures 5/16 inch × ½ inch × 6 inches and weighs approximately 13 grams. This strip was placed in a 50 ml Pyrex pressure tube and conditioned 24 hours at 70° F. and 65 percent RH, along with a neoprene seal and a Crown bottle cap. The tube was then capped while in the same atmosphere and then heated 8 hours at 150° C. After cooling to room temperature, the cord was stripped out of the rubber and then submitted for Nsp measurements. Care was taken to remove as much rubber as possible. The number of "chain scissions" is calculated from viscosity data using the following equation:

No. scissions = $(1/\overline{M}_{n_f} - 1/\overline{M}_{n_o}) \times 10^6$ where
$\overline{M}_{n_f}$ = final $\overline{M}_n$
$\overline{M}_{n_o}$ = initial $\overline{M}_n$
$\overline{M}_w$ is assumed to be 1.9 $\overline{M}_n$ Yarn plus Rubber Sealed Tube Test (Y + RSTT)

Strips of rubber were cured in a mold for 25 minutes, starting with a preheated mold, at 160° C. and under 5 tons of pressure. The mold yielded a pad of rubber 5/16 inch × 6 inches × 7 inches which was cut into strips 5/16 inch × ½ inch × 6 inches. Samples of cord, or yarn, weighing 0.5 gms were wound tightly around the rubber and tied. This strip was placed inside a 50 ml Pyrex pressure tube and conditioned, along with a neoprene seal and bottle cap, at 70° F. and 65 percent R.H. for 24 hours. The bottle was capped in this atmosphere and then heated for 8 hours at 150° C. in a forced air oven. After cooling to room temperature, the cord was removed and submitted for Nsp measurements. The number of "chain scissions" was calculated as in the preceding test.

Aminolytic degradation of yarn samples was determined by exposing the samples in a sample tube at 150° C. to a stream of ammonia at a flow rate of 30–40 cc/min., for a period of 3 hours; and then testing for breaking strength.

A unique feature of polyethylene terephthalate yarns treated with the carbodiimide of this invention is its relatively slow rate of reaction with water. While reactivity with water is reported to be a significant problem with some classes of carbodiimides, yarns coated with 2 percent of the carbodiimide described above, and without a precuring step, were heated for 24 and 48 hours at 80° C. and 100 percent relative humidity. The reaction between the carboxyl end groups of the polyester and the carbodiimide is apparently much faster than the attack of water on the carbodiimide. The carboxyl level in each case was reduced to less than 1 μeq/gram during this low temperature/high humidity heating step.

I claim:

1. Filaments composed of at least 85 percent by weight of an ester of ethylene glycol and terephthalate acid having an aliphatic ether concentration of 0–3 mole percent and surface coated with about ½–2 percent, based on the weight of the filaments of a compound having the general structural formula:

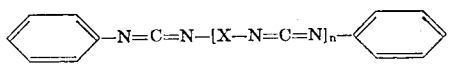

where $x$ is a radical selected from the group consisting of 2, 4 tolylene, 2, 6 tolylene, and mixtures of the above; and $n$ has an average value of about 1.

2. The filaments of claim 1 wherein said coating is present in the amount of about 2 percent based on the weight of the filament.

3. Yarns comprised of the filaments of claim 1.

4. Tire cords comprised of the filaments of claim 1.

5. The process of stabilizing filaments composed of at least 85 percent by weight of an ester of ethylene glycol and terephthalate acid having an aliphatic ether content of 0–3 mole percent comprising contacting said filaments with a solution of a compound having the general formula:

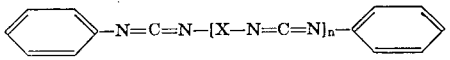

where $x$ is a radical selected from the group consisting of 2, 4 tolylene, 2, 6 tolylene, and mixtures of the above; and $n$ has an average value of about 1, so as to provide a coating on the filaments of from about ½–2 percent, based on the weight of the filaments; whereby the carboxyl end group concentration of said ester is substantially reduced.

6. The process of claim 5 wherein the filaments are thereafter heated at a temperature of about 185° C for about 3 minutes.

7. The process of claim 5 wherein said filaments are in the form of yarn.

8. The process of claim 5 wherein the filaments are in the form of tire cords.

* * * * *